United States Patent [19]

Ven et al.

[11] Patent Number: 5,151,827
[45] Date of Patent: Sep. 29, 1992

[54] SELF-SUPPORTING MIRROR AND METHOD FOR THE MANUFACTURE THEREOF

[75] Inventors: Kari K. M. Ven; Petri A. G. Ven; Irja L. L. M. Ven; Timo Ven, all of Antwerp; Juha Ven, Brasschaat, all of Belgium

[73] Assignee: Aurinco Holdings Limited, Guernsey, Channel Islands

[21] Appl. No.: 701,837

[22] Filed: May 17, 1991

[30] Foreign Application Priority Data

May 18, 1990 [BE] Belgium .......................... 9000527

[51] Int. Cl.⁵ .............................. G02B 5/08
[52] U.S. Cl. ..................... 359/848; 359/883; 428/318.8; 428/912.2
[58] Field of Search ............... 350/607, 609, 610, 641; 428/316.6, 318.8, 912.2

[56] References Cited

U.S. PATENT DOCUMENTS

| | | | |
|---|---|---|---|
| 4,385,804 | 5/1983 | Tamura et al. | 350/641 |
| 4,508,425 | 4/1985 | Tanaka et al. | 350/641 |
| 4,856,887 | 8/1989 | Wakugawa et al. | 350/641 |
| 4,875,766 | 10/1989 | Shimodaira et al. | 350/641 |

Primary Examiner—Bruce Y. Arnold
Assistant Examiner—Ryan
Attorney, Agent, or Firm—Foley & Lardner

[57] ABSTRACT

Mirror, in particular for the utilization of solar rays, which comprises a core (1), on one side of which is disposed a reflective layer (4) and on the other side of which is disposed a protective covering (2). A separate protective covering (3) is applied to the core (1) between the reflective layer (4) and the core (1). The reflective layer (4) is a foil which is applied to the latter protective covering (3).

6 Claims, 1 Drawing Sheet

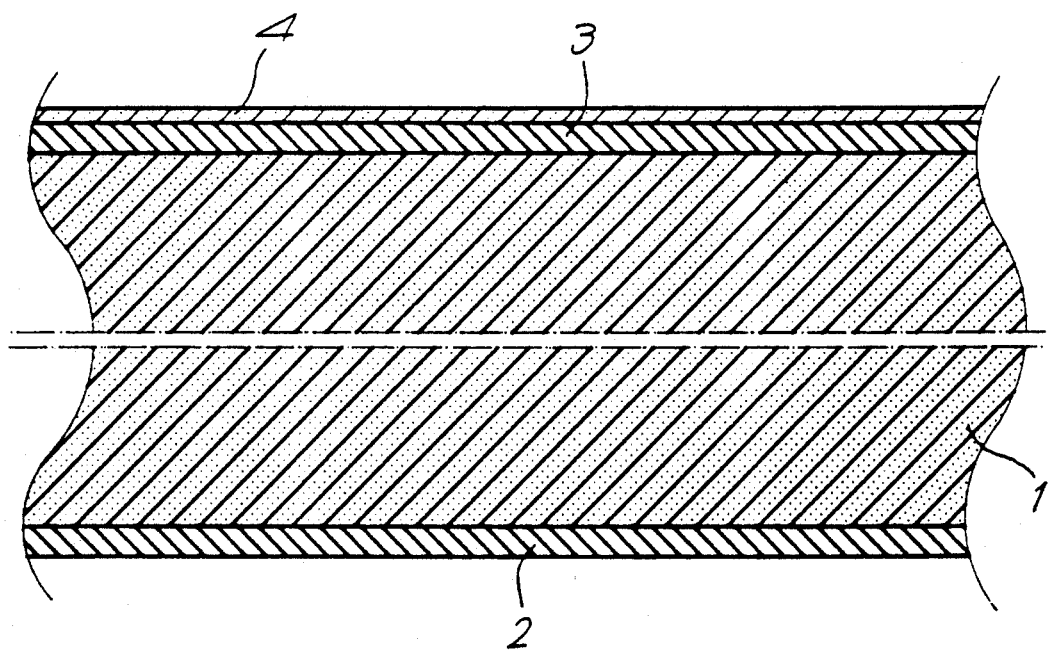

SELF-SUPPORTING MIRROR AND METHOD FOR THE MANUFACTURE THEREOF

BACKGROUND OF THE INVENTION

The invention relates to a mirror, in particular for the utilization of solar rays, which comprises a core, on one side of which is applied a reflective layer and on the other side of which is applied a protective covering.

A mirror of this type is known from the Belgian patent no. 901 639. This patent only describes a curved mirror which comprises a core of hard foam, on one side a protective covering, for example a galvanized steel plate and on the other side only a reflective covering, for example a plate of stainless steel whether or not chromium-plated.

The coverings of the core must, through the formation of a sandwich construction, give a relatively great sturdiness to the mirror. Hence, with the aforementioned known mirror the reflective covering forms a protective covering at the same time which therefore ensures the necessary sturdiness in conjunction with the other protective covering, without provision of strengthening frames being necessary. Because of the fact that the reflective layer must also guarantee the sturdiness, this known mirror is relatively expensive or of a lesser quality. The use of chromium-plated stainless steel plate as a reflective layer is indeed rather expensive. The use of nonchromium-plated stainless steel is less expensive, but the reflective properties thereof are, certainly in the long term, less good.

Furthermore, the reflective layer is already applied in the factory with the manufacture of the mirror so that the danger exists that this layer may become damaged during the transport from the factory to the location where the mirror has to be utilized, and also during the erection of the mirror. If the reflective layer is damaged prior to or after the installation or has to be replaced after installation due to wear and tear, with these known mirrors the entire mirror has to be replaced.

OBJECTS AND SUMMARY OF THE INVENTION

The purpose of the invention is to remedy these disadvantages and to provide a mirror with very good reflective properties but which is nevertheless relatively inexpensive, whereby if required the reflective layer can be applied at the location of utilization in order thereby to reduce the risk of damage to this layer to a minimum, and whereby in case of wear and tear or damage to the reflective layer the entire mirror need not be replaced.

For this purpose a separate protective covering is applied to the core between the reflective layer and the core. The reflective layer is a foil which is applied to the latter protective covering.

The mirror can be considered as consisting of two parts, namely a supporting part consisting of the core and the protective coverings, and a reflective or mirrored part, namely the reflective layer. This reflective layer need not serve any protective or decorative function. Because of this an enormous choice of reflective foils exists which can be utilized for the mirror and a relatively inexpensive reflective foil with good reflective properties can be utilized. This reflective foil can be applied on site just prior to utilization and, insofar as necessary, may later be replaced by a new foil or be covered over by a new foil.

In an advantageous embodiment of the invention the reflective foil is glued to the protective covering which is on the same side of the core.

This reflective foil is preferably a self-adhesive foil.

In a preferably applied embodiment of the invention the protective coverings on both sides of the core are manufactured of the same material. Furthermore they preferably also have the same thickness.

The protective coverings can be manufactured out of steel plate or out of plastic.

The reflective foil typically comprises a base film and a metal sputtered thereon.

The invention also relates to a method for manufacturing the mirror according to one of the preceding embodiments.

The invention thus relates to a method for manufacturing a mirror for the utilization of solar rays, according to which method a reflective layer is applied to one side of a core of hard foam and a protective covering to the other side, of which the characteristic consists in that a protective covering is applied to the core on both sides and a reflective foil is applied to at least one of these coverings.

In a particular embodiment of this method the reflective foil is glued to the protective covering.

First, a primer is suitably applied to the protective covering to which the reflective foil has to be glued in order to promote the adhesion.

In a notable embodiment of the method, the core with the protective covering is first taken to the site and the reflective foil is applied on the spot.

In a preferably applied embodiment of the invention the protective coverings are glued to the core under vacuum.

BRIEF DESCRIPTION OF THE DRAWINGS

Other details and advantages of the invention will appear from the following description of a mirror and a method for the manufacture thereof, according to the invention. This description is only given as example and does not restrict the invention. The reference figures refer to the enclosed drawing.

DETAILED DESCRIPTION OF THE PREFERRED EMBODIMENTS

The mirror according to the invention consists of a core 1 of relatively stiff or hard plastic foam, on one side hereafter called the back, a protective covering 2 is applied and on the other side, hereafter called the front, a protective covering 3 is applied. A reflective foil 4 is provided on the outside of covering 3.

The mirror can be either a flat mirror or a curved mirror. In the latter case it can form a part of a cylinder casing, it can be elongated with a cross-section which forms a parabola or a part thereof, or it can form a parabolic dish.

As suitable plastic for the core 1, polyurethane and polystyrene are eligible. The thickness of the core is situated between 2 and 20 cm. The core can consist of one piece or of several layers glued to each other.

As material for the coverings 2 and 3, especially steel plate is eligible, whether or not stainless or whether or not galvanized. Plates made of plastic such as PVC, PET or PU could also be used for this purpose.

In order to avoid distortion resulting from several expansions, the two coverings 2 and 3 must expand in the same manner. If the covering 2 on the back and the covering 3 on the front are manufactured out of metal, they must for that reason normally be of the same material and have the same thickness. If the coverings 2 and 3 have different coefficients of thermal expansion, the thickness can be different so that under the influence of temperature changes they still behave in the same manner. If the coverings 2 and 3 are of plastic, the thickness thereof may well be different, since plastic anyway expands little or not at all. The thickness of the coverings depends upon the size of the mirror and normally varies between 0.5 and 2 mm. Usually a thickness of almost 0.7 mm is sufficient.

The coverings 2 and 3 are glued to the core 1. This gluing can occur through the application of adhesive. The core 1 can even consist of foamed up synthetic adhesive such as polyurethane glue. Together with the core 1 the coverings 2 and 3 form a very sturdy sandwich structure. This structure is self-supporting, inflexible, and non-reflective.

The reflective foil 4 need not in itself have any sturdiness. This foil 4 is glued onto the protective covering 3 on the front and is preferably a self-adhesive foil. This foil 4 is itself composed of several layers, namely a base film of plastic, a layer of metal such as silver or gold sputtered thereon that provides the reflective effect, and on top of that a translucent protective layer, for example of translucent plastic. With a self-adhesive foil 4 a layer of adhesive is applied to the back of the base film.

In order to improve the adhesion of this foil 4 to the covering 3, especially in case this is manufactured out of steel plate, this covering 3 is covered with a layer of primer especially suitable for that purpose.

The edges of the mirror can possibly be finished off by frames which possibly but not necessarily contribute to the sturdiness.

In a variant the covering 2 on the back is also covered on the outside with a reflective foil 4 glued thereto. This variant is especially useful if solar rays can also fall on the back of the mirror. The reflective foil 4 on the back also prevents a different expansion of the coverings 2 and 3. This foil 4 further forms a protection against corrosion so that this variant is also especially useful for use in a salty atmosphere.

For the manufacture of the mirror, first the core 1 is either manufactured in a mold or by extrusion. Preference is given to extrusion since an extruded core is sturdier than a core obtained by ordinary expansion. The core 1 can be manufactured in one layer or composed of several layers. In the latter case strengthening layers such as metal plates can possibly be applied between the layers. The layers of the core 1 are glued together at the same time with the gluing of the coverings 2 and 3 onto the core 1.

If the core 1 consists of one layer or of several relatively thick layers, then bending can hardly still take place after hardening of the core 1. Hence, in such a case, for the manufacture of a curved mirror, this core 1 is bent before it has completely hardened. For this purpose use is made of a form or mold. It is not necessary to give the core the definite form already. A small distortion afterward, and more specifically with the gluing of the coverings 2 and 3 is still possible. In case the core consists of thin layers such a pre-bending is not necessary since these layers can still be bent sufficiently after hardening.

After hardening of the core 1, the coverings 2 and 3 are glued thereon. Adhesive is applied to both sides of the core 1 and possibly also to the coverings 2 and 3 on the side of the core 1. If the core 1 consists of several layers, adhesive is also applied to these layers. Polyurethane glue is a suitable adhesive for a core of polystyrene.

The gluing of the coverings 2 and 3 is preferably effected under vacuum. For this purpose the unit formed by the core 1 with glue applied and the coverings 2 and 3 whether or not with glue applied is placed on a mold which is provided with openings through which vacuum can be created. An airtight foil, such as a rubber cloth is installed over this unit, which connects hermetically to the mold, after which a vacuum is created in the mold.

During the gluing the unit formed by the core 1 and the coverings 2 and 3 obtains its definite form. After hardening of the adhesive the vacuum is stopped, the airtight foil is removed, and the aforementioned unit is taken out of the mold.

The core 1 can however also be formed between coverings 2 and 3 whereby the material of the core is therefore allowed to foam up and harden between the coverings. In the latter case adhesive need not necessarily be utilized in order to glue the coverings 2 and 3 to the core 1.

The reflective foil 4 is applied to one covering 3 or both coverings 2 and 3, either prior to the gluing of the coverings 2 and 3 to the core 1, or immediately after this gluing, or still later when the mirror is brought into position on the site.

A layer of primer is applied on the covering 3, and possibly on the covering 2 if a reflective foil 4 has to be applied thereon, for the improvement of the adhesion of the foil 4.

The transport and possibly the assembly for example on a moving support can be effected without the reflective foil 4, which transport the assembly almost totally excludes damage to this foil.

The mirror for the utilization of solar rays can take on enormous dimensions. An elongated mirror can for example have a length of up to 16 m. or more. In this case the mirror, without the reflective foil 4, as described here is manufactured in pieces of 2 m. length for an elongated mirror. On the site these pieces are mounted next to each other and in a known manner attached to each other. The pieces can be provided with a reflective foil 4 beforehand, but the reflective foil 4 is preferably applied afterward whereby this foil 4 can be glued on the front or possibly on the back in one piece over all the pieces of mirror.

The above described mirror is relatively sturdy but nevertheless relatively light. It can also be produced relatively inexpensively but can nevertheless have excellent reflective properties. Because of the fact that the reflective foil only needs to be applied on the site, the chance of damaging this foil is minimal. Furthermore, insofar as this may appear necessary, a new reflective foil 4 can be applied easily, whereby the old foil can remain in place or can first be removed.

The reflective foil 4 can be relatively inexpensive. The mirror is not susceptible to thermal shocks up to 70 degrees Centigrade. The mirror can be glued or mechanically attached to a framework, for example by bolts. This framework can then itself be mounted rotatably on a support. The maintenance of the mirror is simple and inexpensive.

The present invention is in no way restricted to the embodiments described above and within the scope of the patent application many changes can be applied to these embodiments.

We claim:

1. A method for manufacturing a mirror for the utilization of solar rays, comprising the steps of:
   preparing a core composed of hard foam and having two sides;
   gluing protective coverings on both sides of said core under a vacuum; and
   applying a reflective foil to at least one of said protective coverings.

2. The method of claim 1, comprising gluing said reflective foil to at least one of said protective coverings.

3. The method of claim 1, further comprising applying a layer of primer to at least one of said protective coverings prior to said step of applying said reflective foil, thereby promoting adhesion.

4. The method of claim 1, wherein said step of preparing said core comprises bending said core prior to said step of gluing said protective covering.

5. The method of claim 1, wherein said step of applying said reflective foil takes place after said core is brought to a site of use.

6. A mirror prepared according to the method of claim 1.

* * * * *